United States Patent
Shibuya et al.

(10) Patent No.: US 6,534,957 B2
(45) Date of Patent: Mar. 18, 2003

(54) CHARGING METHOD FOR CHARGING NONAQUEOUS ELECTROLYTE SECONDARY BATTERY

(75) Inventors: Mashio Shibuya, Fukushima (JP); Tomitaro Hara, Kanagawa (JP); Yusuke Suzuki, Miyagi (JP); Akinori Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 09/859,058

(22) Filed: May 16, 2001

(65) Prior Publication Data

US 2002/0034678 A1 Mar. 21, 2002

(30) Foreign Application Priority Data

May 16, 2000 (JP) ........................................ 2000-144042

(51) Int. Cl.$^7$ .............................................. H01M 10/44

(52) U.S. Cl. ....................................................... 320/160

(58) Field of Search .................................. 320/110, 124, 320/125, 127, 128, 137, 160; 429/300, 309, 324, 326, 30, FOR 104

(56) References Cited

U.S. PATENT DOCUMENTS 5,853,914 A * 12/1998 Kawakami
5,916,707 A * 6/1999 Omaru et al.

* cited by examiner

Primary Examiner—Edward H. Tso
(74) Attorney, Agent, or Firm—Sonnenschein, Nath & Rosenthal (57) ABSTRACT

An initial charging operation is carried out by a charging step composed of two-stages or more to improve an initial charging and discharging efficiency, reduce the charge of wasteful materials and improve a high capacity and a high cyclic characteristic without deteriorating various kinds of battery properties. In order to realize the improvements, a nonaqueous solvent which is decomposed under a potential higher than the reduction and decomposition potential of a main solvent is included in electrolyte. This charging method is a method for achieving the addition effect of such a nonaqueous solvent as much as possible. As a specific means, the electrolyte to which vinylene carbonate is added is employed and a constant-current and constant-voltage charge under about 3.2 V is carried out for 1 to 2 hours before a battery is completely charged. Thus, a good coat can be formed on the surface of an anode while suppressing the quantity of electricity required for forming the coat.

30 Claims, 4 Drawing Sheets

CHARGING METHOD FOR CHARGING NONAQUEOUS ELECTROLYTE SECONDARY BATTERY

RELATED APPLICATION DATA

The present application claims priority to Japanese Application No. P2000-144042 filed May 16, 2000, which application is incorporated herein by reference to the extent permitted by law.

BACKGROUND OF THE INVENTION

The present invention relates to a charging method for charging a nonaqueous electrolyte secondary battery (for instance, what is called, a lithium-ion secondary battery), and more particularly to a completely new charging method by which the high performance of the nonaqueous electrolyte secondary battery can be sufficiently achieved.

A battery has recently occupied an important position as the power source of a portable electronic device. In order to realize a compact and light device, it has been necessary for the battery to decrease its weight, and accordingly, such a battery as to efficiently use an accommodation space in the device has been demanded.

A lithium battery high in its energy density and output density is most suitable for meeting these demands.

The lithium secondary battery having the above described high performance has been further requested to have a higher performance so as to meet circumstances where the device with high performance is developed.

At that time, there arises a problem that an electrolyte is inconveniently decomposed on the surface of the anode of the battery.

Since the anode of the lithium secondary battery is exposed to a strong reducing atmosphere, the anode of the lithium battery in its charged state is naturally extremely apt to react to the electrolyte. Thus, the electrolyte employed in the lithium secondary battery forms a metastable state by producing a passive coat on the surface of the anode.

However, this coat undesirably causes the capacity of the battery to be decreased. At the time of initially charging after the battery is assembled, a certain degree of amount of charge carrier is employed to form the coat. Therefore, for instance, if the lithium doping/dedoping capability of a carbon material is examined in a test battery having a counter electrode composed of lithium metal, an initial discharge (lithium dedoping) capacity is smaller than an initial charge (lithium doping) capacity and the ratio thereof (initial charging and discharging efficiency=initial discharge capacity/initial charge capacity) is 80% to 95% in the case of a material which can be used as an anode material and the ratio is smaller in the case of carbon which cannot be used as an anode material.

In this case, the charge capacity is determined depending on the amount of an active material with which the battery is charged. The initial discharge capacity is equivalent to the capacity of the battery upon its use. Accordingly, a battery whose initial charging and discharging efficiency is low is disadvantageously equivalent to a wasteful battery whose amount of charge is large and a usable capacity is low.

The initial charging and discharging efficiency is dependent on a coat slightly formed on a cathode, the change of the crystal structure of the cathode as well as the coat forming reaction of the anode, however, the initial charging and discharging efficiency may be more greatly dependent on the anode. The passive coat on the surface of the anode is essentially required. Therefore, when this coat is generated with a minimum quantity of electricity, wastefulness can be reduced. Thus, the battery with high capacity and high energy density can be manufactured by charging the battery with the same battery material.

SUMMARY OF THE INVENTION

The present invention is proposed by considering the above described conventional problems and it is an object of the present invention to provide a new charging method in which the quantity of electricity necessary for forming a coat can be suppressed, an initial charging and discharging efficiency can be enhanced and the high performance (for instance, high capacity) of a nonaqueous electrolyte secondary battery can be sufficiently achieved.

The inventors of the present invention eagerly studied this object and found that a battery with high performance can be formed by generating a small quantity of stable coat on the surface of an anode. Since the quantity of electricity necessary for generating the coat is decreased, and accordingly, the charging and discharging efficiency can be enhanced, a discharge capacity can be increased. Further, a cyclic life characteristic is also improved without generating troubles for other battery performances.

The present invention was completed on the basis of the above described knowledge.

According to one aspect of the present invention, there is provided a charging method for initially charging a nonaqueous electrolyte secondary battery comprising an anode and a cathode and an electrolyte including a plurality of kinds of nonaqueous solvents, the nonaqueous solvents including a main solvent and one or more kinds of nonaqueous solvents having a reduction potential higher than that of the main solvent; the charging method comprising: charging steps of two or more stages including a first charging step in which the potential of the anode is maintained in a potential where any one of the nonaqueous solvents having the reduction potential higher than that of the main solvent is reduced and decomposed and the main solvent is not reduced nor decomposed to achieve a first charging process.

Further, according to another aspect of the present invention, there is provided a charging method for initially charging a nonaqueous electrolyte secondary battery comprising an anode and a cathode and an electrolyte including a plurality of kinds of nonaqueous solvents, the nonaqueous solvents including a main solvent and one or more kinds of nonaqueous solvents having a reduction potential higher than that of the main solvent; the charging method comprising: charging steps of two or more stages including a first charging step in which the value of the end voltage of a constant-current charge or the value of the constant-voltage of a constant-current and constant-voltage charge is set so that the potential of the anode ranges from 0.7 V to 3.0 V by using the potential of lithium metal as a reference to achieve a first charging process.

In the charging method according to the present invention, the first charging process is carried out by the charging step having two or more stages so that the initial charging and discharging efficiency is enhanced, the preparation of a wasteful material is decreased and high capacity and cyclic characteristics are improved without deteriorating various characteristics of the battery.

In order to realize the above operation, it is necessary to include a nonaqueous solvent decomposed under a potential higher than the reduction and decomposition potential of a main solvent in an electrolyte and this charging method serves to draw out the addition effect of such a nonaqueous solvent to its maximum.

As one specific means of the charging method, an electrolyte to which vinylene carbonate is added is used to initially carry out a constant-current and constant-voltage charge of about 3.2 V for 1 to 2 hours. Thus, a desirable coat can be formed on the surface of an anode.

BRIEF DESCRIPTION OF THE DRAWINGS

The object and other objects and advantages of the present invention will appear more clearly from the following description in conjunction with the accompanying drawings in which.

DETAILED DESCRIPTION OF THE PREFERRED EMBODIMENT

Now, referring to the drawings, a charging method to which the present invention is applied will be described in detail.

The charging method according to the present invention is based on a basic conception that an initial charging process is carried out by a charging step having two or more stages. More specifically, a first charging step in which a stable and thin coat is formed on the surface of an anode is performed, and then, a second charging step is performed in which a charging process is carried out so that the potential of an anode is lower than a potential in the first charging step, for instance, the charging process is carried out until a battery is completely charged.

Here, the first charging step is important and the conditions of the first charging step are specified so that a good coat can be formed.

In the present invention, one or more kinds of nonaqueous solvents having a reduction potential higher than that of a main solvent are added to the main solvent and the first charging step is carried out so that the added nonaqueous solvents are reduced and decomposed and the potential of an anode is maintained at a potential under which the main solvent is not reduced nor decomposed.

Further, in the present invention, the main solvent means a solvent the rate of which occupies 10 wt % or more of all the amount of the solvents and ethylene carbonate (EC) or propylene carbonate (PC) or the like as described below corresponds thereto.

The potential of the anode in the first charging step is equivalent to 0.7 V to 3.0 V by considering lithium metal to be a reference (vs Li/Li$^+$) in a battery system using ethylene carbonate or propylene carbonate, or the like for the main solvent. Under the above potential of the anode, the main solvent is not reduced nor decomposed. Therefore, in other words, the first charging step may be equivalent to a charging step in which the value of end voltage of a constant-current charge or the value of constant-voltage of a constant-current and constant-voltage charge is set so that the potential of the anode is located within the above described range.

As one of means for forming the coat, vinylene carbonate (VC) may be added to an electrolyte as a nonaqueous solvent having a reduction potential higher than that of the main solvent.

The vinylene carbonate is reduced in the vicinity of a potential of 0.9 V to 1.1 V (vs Li/Li$^+$) to generate a coat. This coat can be formed by performing the charging process in accordance with the proper procedure as described above during the initial charge.

It is to be understood that the vinylene carbonate is not necessarily required to form the coat on the surface of the anode and other nonaqueous solvents may be employed as nonaqueous solvents having the reduction potential higher than that of the main solvent.

It is important that, before a coat obtained when the main solvent is decomposed is generated, such a thin coat as to prevent the formation of the coat is generated on the surface of the anode. For this purpose, when an addition agent such as vinylene carbonate is employed, an addition effect thereof needs to be achieved to its maximum degree.

Such a material as vinylene carbonate cannot realize its effect only by charging the electrolyte with this material.

The reaction of vinylene carbonate (VC) is apt to be energetically generated on the basis of a potential, however, the reaction speed thereof is low, so that a coat is generated by other solvent such as PC before the VC forms a good coat.

In order to solve the above problem, a charging operation is first carried out so as to reduce and decompose only a coat forming material such as vinylene carbonate. After the coat of vinylene carbonate is formed, a charging operation is carried out so as to insert Li.

Figure 1:
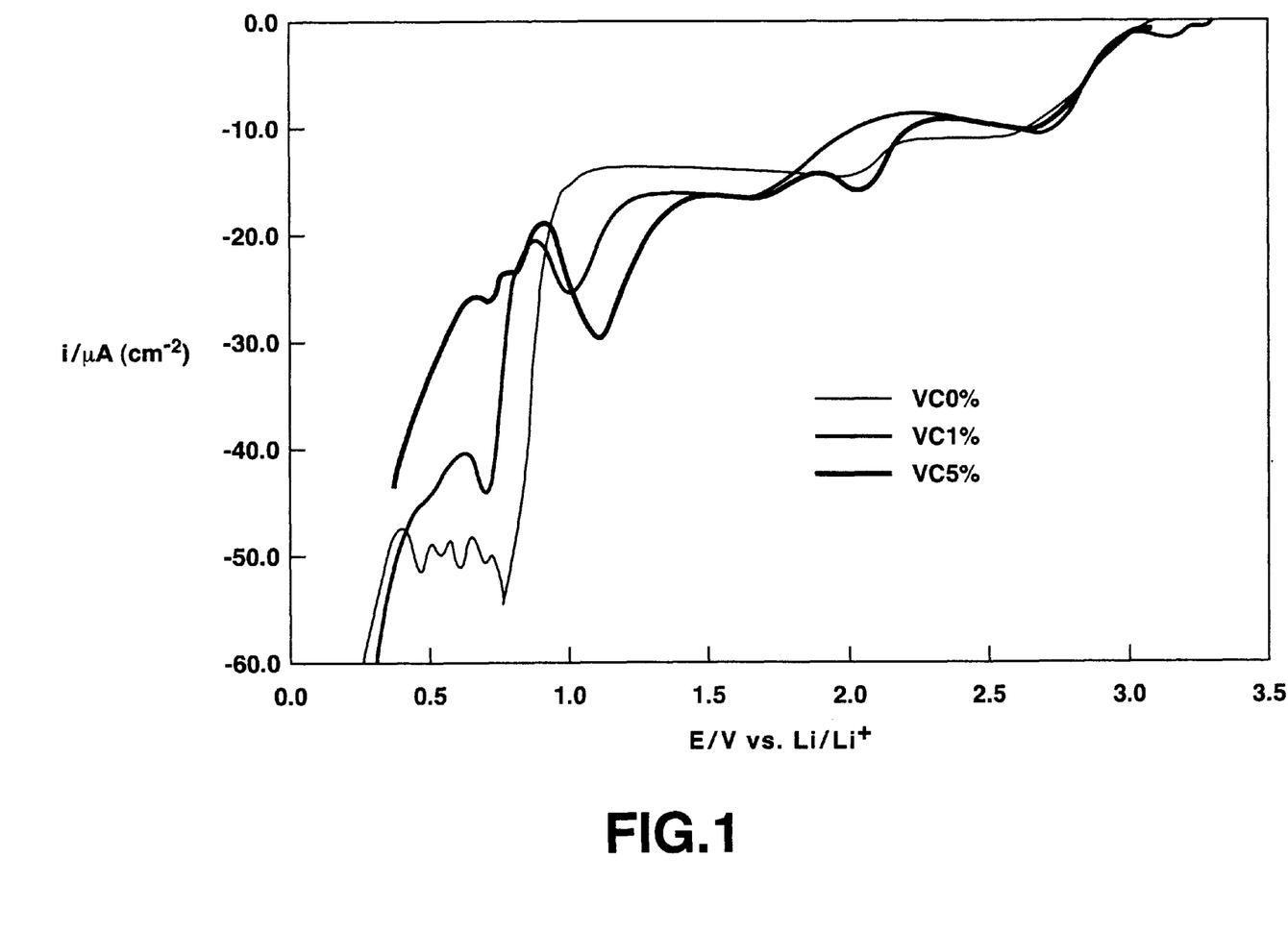
FIG. 1 is a characteristic view showing the difference between polarization curves due to the presence or absence of the addition of vinylene carbonate.

FIG. 1 shows polarization curves when vinylene carbonate is added to electrolyte solution with a composition including ethylene carbonate or propylene carbonate and a graphite (MCMB: mesophase carbon microbeads) anode is employed as a working electrode.

This shows a measuring method for regulating a potential similar to a measuring method called a cyclic voltammogram and an axis of abscissas indicates the potential of the working electrode (MCMB) relative to Li and an axis of ordinates a current density (current/area of electrode) at that time.

In this case, the electrolyte solution used upon measurement includes ethylene carbonate and propylene carbonate having the ratio EC PC equal to 1: 1 and 0.9 mol/kg of LiPF$_6$. Further, a reference electrode is compose of Li and a scanning rate is 30 $\mu$V/second.

Initially, the potential of about 3 V to 3.5 V (vs Li/Li$^+$) is used. Then, when the potential is changed to become low at the rate of 30 $\mu$V/second, in case of vinylene carbonate is contained in the electrolyte, a reduction peak (a point at which a downward current flows) appears in the vicinity of 1 V (vs Li/Li$^+$). This is the reduction current of vinylene carbonate.

After that, a large amount of current flows in the vicinity from 0.8 V to 0.4 V (vs Li/Li$^+$). This designates the reduction current of ethylene carbonate or propylene carbonate.

When the vinylene carbonate is not contained in the electrolyte, the reduction current of the ethylene carbonate or propylene carbonate designates a large amount of current. When the vinylene carbonate is included in the electrolyte, the reduction current of the ethylene carbonate or propylene carbonate indicates a small amount of current. Thus, it is apparent that the reaction of the ethylene carbonate or propylene carbonate can be suppressed by adding vinylene carbonate to the electrolyte.

The purpose of the present invention resides in that the potential of the anode is held at a potential located between the two reactions to form a thin and stable coat on the surface of the anode.

Here, assuming that the vinylene carbonate is reduced under the potential of 1 V (vs Li/Li$^+$) and the ethylene carbonate or propylene carbonate is reduced under the potential of 0.7 V (vs Li/Li$^+$), when the potential of the anode is held at, for instance, 0.5 V (vs Li/Li$^+$), it may be considered that the charging process of two-stages is not required, because the vinylene carbonate liable to be reduced first reacts.

However, this conception relates to the problem of the reaction kinetics and thermodynamic equilibrium. In practice, the charging step of two-stages is carried out so that the above described coat of vinylene carbonate can be formed on the surface of the anode.

Figure 2:
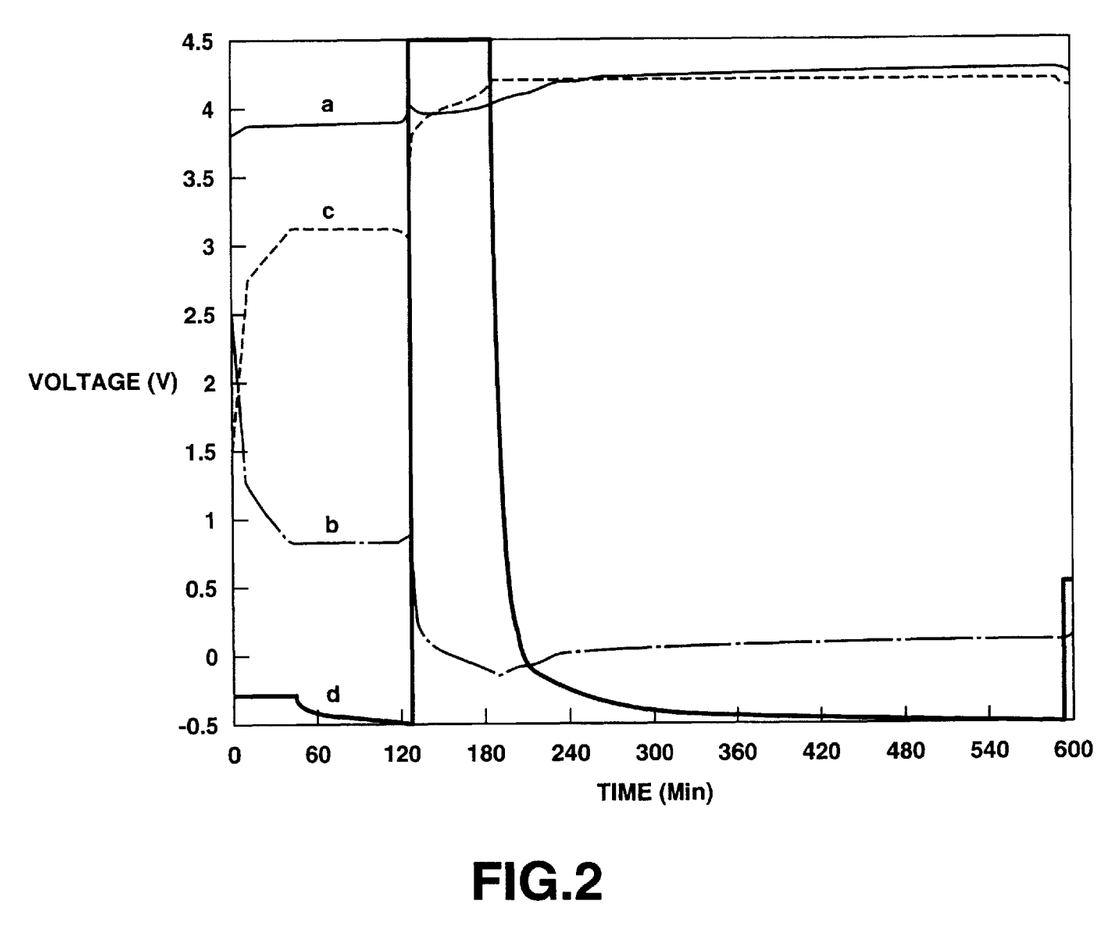
FIG. 2 is a characteristic view showing charging curves when the potentials of a cathode and an anode are measured by attaching a reference electrode to a battery performing a two-stage charge.

FIG. 2 shows charging curves when the potentials of a cathode and the anode are measured by attaching a reference electrode to a battery which carries out a two-stage charge.

In FIG. 2, a line a designates the potential of the cathode, a line b designates the potential of the anode, a line c designates battery voltage (=the potential of the cathode−the potential of the anode) and a line d designates a current value at that time.

Initially, the first charging step is started under the charging current value of 20 mA of 4% C. At this time, the potential of the cathode immediately reaches 3.9 V (vs Li/Li$^+$) and becomes substantially constant. The potential of the anode immediately reaches 2 V (vs Li/Li$^+$) and gradually becomes low. The difference between the potential of the cathode and the potential of the anode designates the battery voltage. The battery voltage immediately reaches about 2 V and gradually becomes high.

The battery voltage reaches 3.1 V as setting battery voltage for about 45 minutes so that the constant-current charge is completed and it is switched to the constant-voltage charge. In this range, since the potential of the cathode is substantially constant-voltage, the potential of the anode is also constant and held at 0.8 V (vs Li/Li$^+$) as the reduction potential of vinylene carbonate so that the reduction and decomposition reaction of vinylene carbonate is generated. At this time, the decomposition of ethylene carbonate or propylene carbonate is not substantially generated.

After the lapse of two hours, the first charging operation is finished. Then, the constant-current and constant-voltage charge of 1 C-4.2V is started to completely charge a battery. At this time, the reduced coat of vinylene carbonate is already formed on the surface of the anode. Accordingly, even when the coat of the vinylene carbonate passes through an area in which the ethylene carbonate or propylene carbonate as the main solvent is decomposed, the formation of a wasteful coat is decreased.

However, the formation of the coat cannot be apparently recognized from FIG. 2. In order to examine the formation of the coat, it is necessary to carry out a surface analysis of an actual battery.

When the inventors of the present invention actually performed the surface analysis of the battery, they found that, when vinylene carbonate was added to the main solvent, a passive coat formed on the surface of the anode was thin and included a large amount of organic materials composed of C and O, and, on the other hand, when the vinylene carbonate was not added to the main solvent, a thick coat composed of inorganic materials including Li (possibly Li$_2$CO$_3$, or the like) was formed.

The above described surface analysis may lead to the following estimation. Since the vinylene carbonate is reduced to cover the surface of the anode with a thin organic coat, the decomposition of propylene carbonate or the like can be suppressed so that Li$_2$CO$_3$ produced due to the reduction and decomposition of propylene carbonate is deceased. This phenomenon may contribute to the decrease of wastefulness of a capacity, a high discharge capacity and a high charging and discharging efficiency.

The above described first charging step may be carried out by any one of the constant-current charge, the constant-voltage charge and the constant-current and constant-voltage charge. The constant-current charge or the constant-current and constant-voltage charge is preferable and the constant-current and constant-voltage charge is most preferable. For instance, a method in which the first charging step is performed only by a constant-current charge with a relatively small current value and it is finished when the potential reaches the reduction potential of vinylene carbonate can achieve an effect, however, this method is not desirable from the viewpoint of efficiency in time.

In either case, it is desirable to use the charging current value of 10% C or lower in the first charging step. When the charging current value is increased to abruptly advance the reaction, a desired coat cannot be formed.

The second charging step after the first charging step may be carried out by any one of the constant-current charge, the constant-voltage charge and the constant-current and constant-voltage charge. Further, the second charging step is ordinarily carried out by completely charging the battery, however, the battery may not be necessarily fully charged. Still further, the charging step after the first charging step may be divided into two sections or more and the charging steps may be performed two times or more.

Further, when the vinylene carbonate is added to the electrolyte, it is desirable to set the first charging step and the second charging step so as to be optimized depending on the kinds of anode active materials or cathode active materials.

For instance, in case a nonaqueous electrolyte secondary battery comprises the anode including a carbon material as an anode active material and the cathode including lithium cobalt compound oxide obtained by replacing a part of LiCoO$_2$ and/or Co by other elements as a cathode active material, the first charging step is carried out in accordance with the constant-current charge or the constant-current and constant-voltage charge having the end voltage value or the constant-voltage value of 3.1 V to 3.7 V. Then, the constant-current charge or the constant-current and constant-voltage charge having the end voltage value or the constant-voltage value of which exceeds the end voltage value or the constant-voltage value in the first charging step and is not higher than 4.4 V is carried out as the second charging step.

When a nonaqueous electrolyte secondary battery comprises the anode including a carbon material as an anode active material and the cathode including at least one kind of materials selected from LiMn$_2$O$_4$, LiNiO$_2$ or lithium compound oxide obtained by replacing a part of Mn or Ni by other elements as a cathode active material, the first charging step is carried out in accordance with the constant-current charge or the constant-current and constant-voltage charge having the end voltage value or the constant-voltage value of which ranges from 2.8 V to 3.6 V, and then, the constant-current charge or the constant-current and constant-voltage charge having the end voltage value or the constant-voltage value of which exceeds the end voltage value or the constant-voltage value in the first charging step and is not higher than 4.4 V is carried out as the second charging step.

In case a nonaqueous electrolyte secondary battery comprises the anode including a carbon material as an anode active material and the cathode including $LiFePO_4$ and/or olivine compound oxide obtained by replacing a part of Fe by other elements, the first charging step is carried out in accordance with the constant-current and constant-voltage charge having the end voltage value or the constant-voltage value of which ranges 2.5 V to 2.9 V, and then, the second charging step is carried out under the constant-current charge or the constant-current and constant-voltage charge having the end voltage value or the constant-voltage value of which exceeds the end voltage value or the constant-voltage value in the first charging step and is not higher than 4.4 V.

It is to be understood that a compound to be added to the electrolyte as the nonaqueous solvent is not limited to the above described vinylene carbonate and may be any compound such as a derivative which has a reduction and decomposition potential higher than that of the main solvent and can form a stable coat. Further, a plurality of kinds of compounds may be used at the same time. In this case, the potential of the anode held in order to form a coat in the first charging step may be set to the reduction potential of any compound. However, since the addition of the vinylene carbonate is effective for forming the good coat, it is most effective that the potential of the anode is held at the reduction and decomposition potential of the vinylene carbonate as mentioned above, when a plurality of compounds having the reduction and decomposition potential than that of the main solvent are added to the electrolyte.

Further, especially when the current collector of the anode is made of copper, an initial charging step for preventing the elution of the copper may be performed before the first charging step.

When the battery is charged in order to avoid the elution of the copper after the battery is assembled, it is necessary to immediately shift the potential of the anode under which the copper may be oxidized and dissolved to a reduction side. Since the potential of the cathode just after the battery is charged is about 3.9 V (vs $Li/Li^+$) and the dissolution of the copper is generated from about 3.4 V (vs $Li/Li^+$), when the potential difference ranges from about 0.5 V to 1 V, in other words, the battery is charged until the battery voltage reaches about 0.5 V to 1 V, the elution of the copper can be avoided. This initial charging step may be carried out under the constant-current and constant-voltage charge. However, since an amount of current flowing through this area is not so large, the initial charging step can be carried out in accordance with the constant-voltage charge.

Now, the nonaqueous electrolyte secondary battery to which the present invention is applied will be described below.

Figure 3:
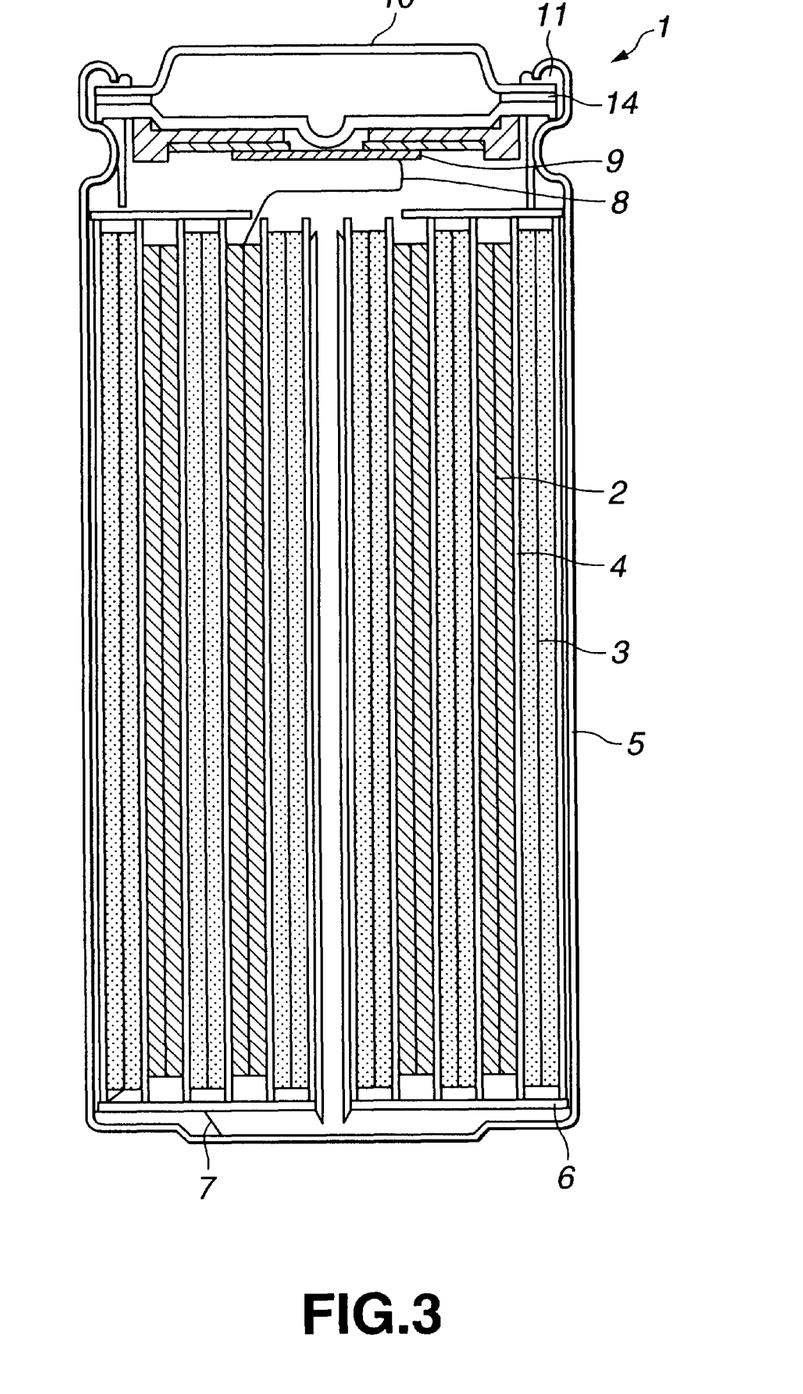
FIG. 3 is a schematic sectional view showing one structural example of a cylindrical nonaqueous electrolyte battery.

The nonaqueous electrolyte secondary battery 1 comprises, as shown in FIG. 3, a battery element having a strip cathode 2 and a strip anode 3 wound tightly through separators 4 and a battery can 5 in which the battery element is contained.

The cathode 2 is manufactured by applying a cathode compound agent including a cathode active material and a binding agent to a current collector and drying the applied cathode compound agent. A metallic foil such as aluminum foil is used for the current collector.

As the cathode active material, metallic oxides, metallic sulfides or specific high polymers can be employed depending on the kind of an objective battery.

For instance, in the case of a lithium battery utilizing the dissolution and deposition of lithium, metallic sulfides or metallic oxides containing no lithium such as $TiS_2$, $MoS_2$, $NbSe_2$, $V_2O_5$, or the like, and high polymers such as polyacetylene, polypyrrole can be used.

In the case of a lithium-ion battery doped/dedoped with lithium ions, lithium compound oxides including as a main component $Li_xMO_2$ (in the formula, M designates one or more kinds of transition metals, x is different dependent on the charged or discharged state of the battery and ordinarily 0.05 or more and 1.10 or lower) can be employed. As the transition metals M constituting the lithium compound oxides, Co, Ni, Mn, or the like are preferable. As such lithium compound oxides, there may be exemplified $LiCoO_2$, $LiNiO_2$, $LiNi_yCo_{1-y}O^2$ (in the formula, the relation of $0<y<1$ is established), $LiMn_2O_4$, $LiMPO_4$ (In the formula, M indicates one or more kinds of transition metals such as Fe).

The lithium compound oxides can generate high voltage so that it may be a cathode active material excellent in its energy density. As the cathode active material, a plurality of kinds of cathode active materials may be simultaneously employed. Further, when the above cathode active materials are used to form the cathode active material, a well-known conductive agent or a binding agent may be added thereto.

The anode 3 is manufactured by applying an anode compound agent including an anode active material and a binding agent to the current collector and drying the anode compound agent. A metallic foil such as copper foil is used for the current collector.

For instance, in the case of the lithium battery utilizing the dissolution and deposition of the lithium, lithium alloys or the like capable of doping/dedoping the lithium can be used as the anode active materials.

When the lithium-ion battery doped/dedoped with lithium ions is used, non-graphitizable carbon materials or graphite carbon materials may be employed. More specifically, there may be used carbon materials, including graphites, mesocarbon microbeads, carbon fibers such as mesophase carbon fibers, pyrocarbons, cokes (pitch cokes, needle cokes, petroleum cokes), vitreous carbons, organic polymer compound sintered body (products obtained by sintering and carbonizing phenol resin, furan resin or the like at suitable temperature) and activated carbon. When the anode is formed of these materials, a well-known binding agent can be added thereto.

The nonaqueous electrolyte is prepared by dissolving electrolyte salt in the nonaqueous solvent.

As the main solvent of the nonaqueous solvent, various kinds of nonaqueous solvents which have been hitherto used for the nonaqueous electrolyte solution can be employed. They include, for example, propylene carbonate, ethylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, solvents obtained by replacing hydrogen atoms of these carbonates by halogen atoms, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, methyl butyrate sulfolane, acetonitrile, propiononitrile, methyl propionate, or the like. These nonaqueous solvents may be independently used or a plurality of kinds of them may be mixed together and the obtained mixture may be used.

As the electrolyte salt, at least one compound is desirably used from among $LiPF_6$, $LiBF_4$, $LiCF_3SO_3$, $LiN(CF_3SO_2)_2$, $LiN(C_2F_5SO_2)_2$, or the like.

The above described cathode 2 is allowed to come into tight contact with the anode 3 through the separators 4 and they are spirally wound a plurality of times to form the battery element.

Then, an insulating plate 6 is inserted into the bottom part of the iron battery can 5 to which a nickel plating is applied, and further, the battery element is housed therein.

In order to collect current in the anode 3, one end of an anode lead 7 made of, for example, nickel is pressed to the anode 3 and the other end is welded to the battery can 5. Thus, the battery can 5 is conductively connected to the anode 3 and serves as the external anode terminal of the nonaqueous electrolyte battery 1.

Further, in order to collect current in the cathode 2, one end of a cathode lead 8 made of, for example, aluminum is attached to the cathode 2 and the other end is electrically connected to a battery cover 10 through a current shutting-off thin plate 9. This current shutting-off thin plate 9 serves to shut off electric current in accordance with the internal pressure of the battery. Thus, the battery cover 10 is conductively connected to the cathode 2 and functions as the external cathode terminal of the nonaqueous electrolyte battery 1.

Subsequently, the nonaqueous electrolyte is injected into the battery can 5. The nonaqueous electrolyte is prepared by dissolving the electrolyte salt into the nonaqueous solvent as previously described.

Finally, the battery can 5 is caulked through an insulating sealing gasket 11 to which asphalt is applied to fix the battery cover 10 to the battery can 5 and completely manufacture the cylindrical type nonaqueous electrolyte battery 1.

In this embodiment, although the nonaqueous electrolyte battery 1 is configured to be cylindrical, it is to be understood that the configuration of the battery is not specially limited thereto, arbitrary configurations such as a square shape, a coin shape, a button shape, or the like may be adopted and any size may be used.

Further, in the above description, although the battery can utilizes a liquid type nonaqueous electrolyte as an example, it is to be understood that for instance, when a gel electrolyte or a solid electrolyte or the like is used as the nonaqueous electrolyte, a thin battery which uses a laminate film as an outer casing material without employing the battery can may be realized.

The gel electrolyte or the solid electrolyte is basically composed of the electrolyte salt, the nonaqueous solvent for dissolving the electrolyte salt and a high polymer matrix for holding the nonaqueous solvent.

In this case, as the nonaqueous solvent or the electrolyte salt, a nonaqueous solvent or electrolyte salt similar to the liquid type electrolyte can be used.

As the high polymer matrix, there are exemplified polyvinylidene fluoride, polyacrylonitrile, polyethylene oxide, polypropylene oxide, polymethacrylonitrile, or the like. In accordance with a state upon use (gel-state, solid-state, or the like), a suitable material is selected from among them and employed.

Figure 4:
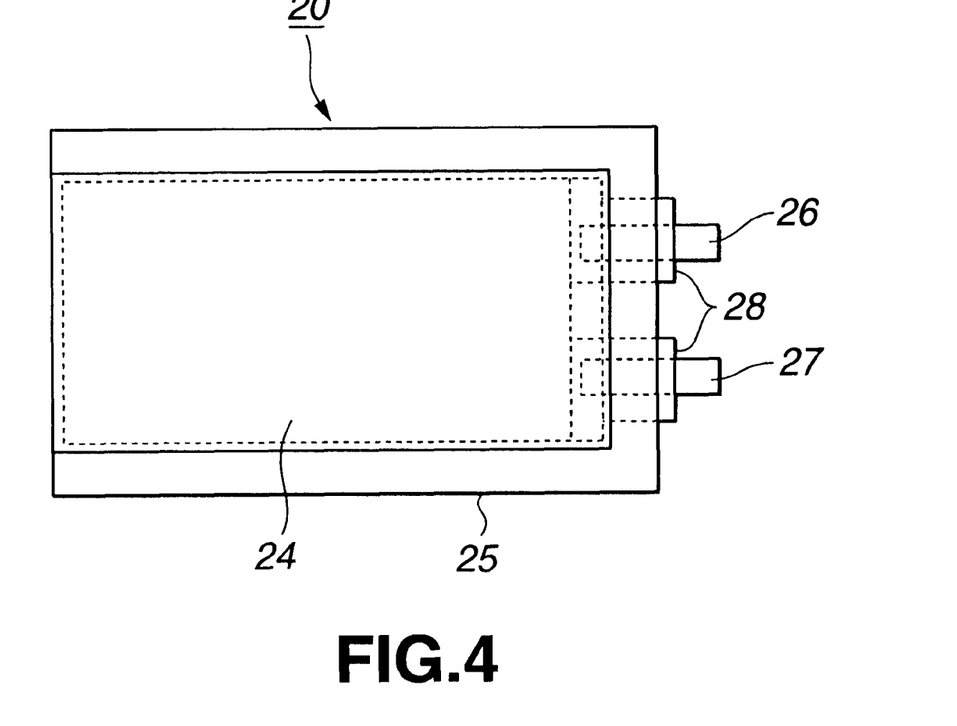
FIG. 4 is a schematic plan view showing one example of a thin nonaqueous electrolyte battery using a gel electrolyte.
Figure 5:
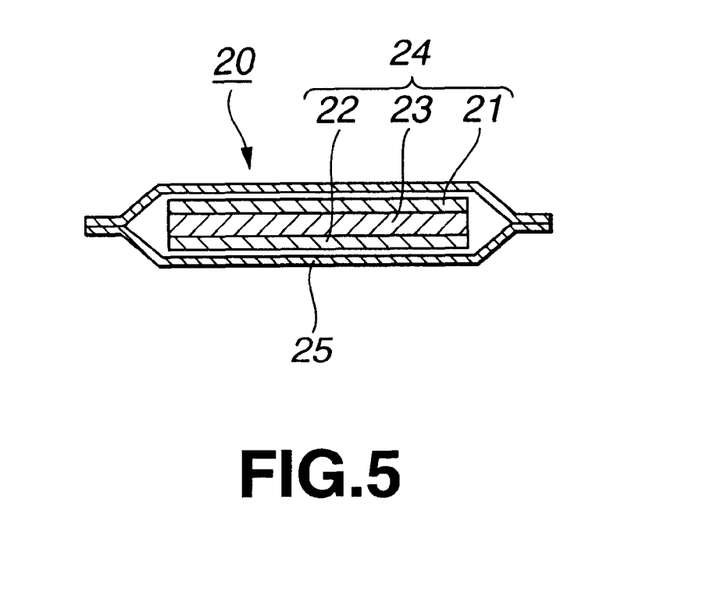
FIG. 5 is a schematic sectional view of the battery shown in FIG. 4.

FIGS. 4 and 5 shows the structural example of a nonaqueous electrolyte battery 20 having a thin configuration. The nonaqueous electrolyte battery 20 comprises a cathode 21 having a cathode active material layer, an anode 22 having an anode active material layer and a separator 23. The cathode 21 and the anode 22 are superposed one upon another through the separator 23 to form a battery element 24. The battery element 24 is sealed in an outer casing film 25.

The current collector of the cathode 21 is connected to a cathode lead 26 and the current collector of the anode 22 is connected to an anode lead 27. Since resin films 28 are provided in sealing parts between the cathode lead 26 and the anode lead 27 and the outer casing film 25 so that an insulating property is ensured and one ends thereof are pulled outside.

Further, the active material layers of the cathode 21 and the anode 22 are respectively impregnated with gel electrolyte layers and solidified and the cathode 21 is superimposed on the anode 22 through the separator 23 so that these gel electrolyte layers are opposed to each other.

Therefore, the separator 23 is also partly impregnated with the gel electrolyte or the nonaqueous solvent in which electrolyte salt included in the gel electrolyte is dissolved.

EXAMPLES

Now, examples to which the present invention is applied will be described in detail on the basis of specific experimental results.

Method for Manufacturing Battery

Battery 1

Now, there will be described methods for manufacturing respective batteries.

Initially, a cathode and an anode were manufactured. The cathode was formed in such a manner as mentioned below.

In order to manufacture the cathode, 92 wt % of lithium cobaltate ($LiCoO_2$), 3 wt % of powdered polyvinylidene fluoride and 5 wt % of powdered graphite were dispersed in N-methyl pyrrolidone (NMP) to prepare a slurry type cathode compound agent. Then, this cathode compound agent was uniformly applied to both the surfaces of an aluminum foil as a cathode current collector. The cathode compound agent was dried at 100° C. for 24 hours under a condition of reduced pressure to form a cathode active material layer. Then, the obtained product was suitably pressed by a roll press to obtain a cathode sheet. The cathode sheet was cut out to a strip form of 50 mm×300 mm and employ the strip as a cathode.

Subsequently, an anode was manufactured in such a manner as described below.

In order to manufacture the anode, 91 wt % of artificial graphite and 9 wt % of powdered polyvinylidene fluoride were dispersed in N-methyl pyrrolidone (NMP) to prepare a slurry type anode compound agent. Then, this anode compound agent was uniformly applied to both the surfaces of a copper foil serving as an anode current collector. The anode compound agent was dried at 120° C. for 24 hours under a condition of reduced pressure to form an anode active material layer. Then, the obtained product was suitably pressed by a roll press to form an anode sheet. The anode sheet was cut out to a strip form of 52 mm×320 mm and employ the strip as an anode.

Examples in which cathodes and anodes employ other active materials will be described later. However, the cathodes and the anodes in other examples were basically manufactured in accordance with the same procedures as mentioned above.

An electrode terminal for the anode was manufactured by cutting out a copper foil or a nickel foil with the thickness of 50 μm and the obtained anode terminal was welded to the current collector of the anode. In the cathode side, an aluminum foil was employed to manufacture a cathode terminal in the same manner as the anode.

As the electrolyte, $LiPF_6$ was dissolved at the rate of 1.0 mol/L in a mixed solvent in which ethylene carbonate (EC), propylene carbonate (PC), ethylmethyl carbonate (EMC) and vinylene carbonate (VC) were mixed together in the weight ratio 33:33:33:1 and the obtained electrolyte solution was employed.

The cathode and the anode thus manufactured were cylindrically wound through a porous polyolefine separator having the thickness of 25 μm and the product with a cylindrical shape was inserted into a tubular metallic outer casing to complete a battery. It is to be recognized that the cathode and the anode may be wound in a flat shape to manufacture a rectangular battery without having any substantial difference from the cylindrical battery, so that the same effect can be expected.

Battery 2

The battery 2 was manufactured in the same manner as that of the battery 1 except that the solvent composition of electrolyte solution had the weight ratio EC to PC to EMC to VC equal to 32:32:32:4.

Battery 3

The battery 3 was manufactured in the same manner as that of the battery 1 except that the solvent composition of electrolyte solution had the weight ratio EC to PC to DEC (diethyl carbonate) to DMC (dimethyl carbonate) to VC equal to 24:24:24:24:1.

Battery 4

As the electrolyte, polyvinylidene fluoride (PVdF) based gelelectrolyte was used for the battery 4.

The polyvinylidene fluoride (PVdF) gel electrolyte and the battery were produced by the following procedure. Polyvinylidene fluoride as a copolymer including less than 7.7% of hexafluoro propylene, electrolyte solution and dimethyl carbonate (DMC) as the solvent of a polymer were mixed together, agitated and dissolved in the electrolyte solution. As the electrolyte solution, $LiPF_6$/EC+PC solution was used. The mixed ratio of EC and PC was adjusted so that EC and PC were mixed in the ratio 60 to 40 and the $LiPF_6$ was adjusted so that it was contained at the rate of 0.9 mol/kg relative to the mass of the solvent. The vinylene carbonate was added to the electrolyte solution at the rate of 1 wt % relative to the mass of the electrolyte solution.

Subsequently, sol-state gel electrolyte was uniformly applied to the active material films of the cathode and the anode and the solvent was volatilized to form the gel electrolyte films on both the electrodes. The cathode and anode were wound in a flat configuration so as to superimposed one upon another and form a battery element. The wound battery element was packaged under a vacuum with a- general purpose aluminum laminate film formed by sandwiching an aluminum foil in between polyolefine films. It is to be understood that a method for packaging the battery element and sealing peripheral parts is not limited to the above method. The battery element may be a flatly wound type, a zigzag folded type or a laminated type. The joined parts of the outer casing may be projected to any direction, left as they are, folded at right angles or folded back. To electrode terminals, resin pieces were allowed to abut on parts at which the terminals intersect the heat sealing parts of the outer casing film to avoid a short-circuit due to burrs and improve the adhesive property between the terminals and the laminate films.

Battery 5

A gel electrolyte battery was manufactured in the same manner as that of the battery 4 except that the VC was added at the rate of 4% relative to the electrolyte solution.

Battery 6

A gel electrolyte battery was manufactured in the same manner as that of the battery 4 except that the mixed ratio EC to PC in the electrolyte solution composed of gel electrolyte is equivalent to 40:60.

Battery 7

As high polymers, polyacrylonitrile and polymethacrylonitrile were used. Polyacrylonitrile having a molecular weight of 200000, polymethacrylonitrile having a molecular weight of 180000, EC, PC and $LiPF_6$ were mixed together in the weight ratio 1:1:9:9:1.7 and VC was further added at the rate of 2% relative to electrolyte solution and the high polymers were dissolved at 90° C. The obtained sol electrolyte solution was applied to the electrodes in the same manner as that of the battery 4, and then, the applied electrolyte solution was gradually cooled to gel. Then, the cathode and the anode were laminated through a separator made of porous polyethylene to form a laminated body. Further, the laminated body was wound in a flat shape similarly to the battery 4 to obtain a battery element. This battery element was packaged with the aluminum laminate film in the same manner as that of the battery 4.

Battery 8

A battery was manufactured in the completely same manner as that of the battery 1 except that the battery was formed by using graphite for an anode and $LiNiO_2$, for a cathode.

Battery 9

A battery was manufactured in the completely same manner as that of the battery 1 except that the battery was formed by using graphite for an anode and $LiFePO_4$ for a cathode.

Battery 10

A battery was manufactured in the completely same manner as that of the battery 1, however, the VC was not added to electrolyte solution.

Battery 11

A battery was manufactured by employing a solvent obtained by mixing EC, PC, DEC and DMC together in the weight ratio 1:1:1:1 in the same manner as that of the battery 3, however, the VC was not added to electrolyte solution.

Battery 12

A gel electrolyte battery was manufactured in the same manner as that of the battery 4, however, the VC was not added to electrolyte solution.

Battery 13

A gel electrolyte battery was manufactured in the same manner as that of the battery 6, however, the VC was not added to electrolyte solution.

Battery 14

A gel electrolyte battery was manufactured in the same manner as that of the battery 7, however, the VC was not added to electrolyte solution.

Battery 15

A gel electrolyte battery was manufactured in the same way as that of the battery 8, however, the VC was not added to electrolyte solution.

Battery 16

A gel electrolyte battery was manufactured in the same way as that of the battery 9, however, the VC was not added to electrolyte solution.

A cathode active material, an anode active material and a solvent composition of electrolyte solution and the amount of addition of vinylene carbonate in each battery are shown in Table 1.

TABLE 1

|   | Cathode | Anode |
|---|---|---|
| 1 | Co | Gra |
| 2 | Co | Gra |
| 3 | Co | Gra |
| 4 | Co | Gra |
| 5 | Co | Gra |
| 6 | Co | Gra |
| 7 | Co | Gra |
| 8 | Ni | Gra |
| 9 | $FePO_4$ | Gra |
| 10 | Co | Gra |
| 11 | Co | Gra |
| 12 | Co | Gra |
| 13 | Co | Gra |
| 14 | Co | Gra |
| 15 | Ni | Gra |
| 16 | $FePO_4$ | Gra |

|   | Solution |   | VC |
|---|---|---|---|
| 1 | Liq: | EC/PC/EMC = 33:33:33, $LiPF_6$ 1M | 1% |
| 2 | Liq: | EC/PC/EMC = 32:32:32, $LiPF_6$ 1M | 4% |
| 3 | Liq: | EC/PC/DEC/DMC = 24:24:24:24, $LiPF_6$ 1M | 4% |
| 4 | Gel: | EC/PC = 6/4, $LiPF_6$ = 0.9 mol/kg | 1% |
| 5 | Gel: | EC/PC = 6/4, $LiPF_6$ = 0.9 mol/kg | 4% |
| 6 | Gel: | EC/PC = 4/6, $LiPF_6$ = 0.9 mol/kg | 1% |
| 7 | Gel: | PAN-PMMA | 1% |
| 8 | Gel: | EC/PC = 6/4, $LiPF_6$ = 0.9 mol/kg | 1% |
| 9 | Gel: | EC/PC = 6/4, $LiPF_6$ = 0.9 mol/kg | 1% |
| 10 | Liq: | EC/PC/EMC = 33:33:33, $LiPF_6$ 1M | 0% |
| 11 | Liq: | EC/PC/DEC/DMC = 24:24:24:24, $LiPF_6$ 1M | 0% |
| 12 | Gel: | EC/PC = 6/4, $LiPF_6$ = 0.9 mol/kg | 0% |
| 13 | Gel: | EC/PC = 4/6, $LiPF_6$ = 0.9 mol/kg | 0% |
| 14 | Gel: | PAN-PMMA | 0% |
| 15 | Gel: | EC/PC = 6/4, $LiPF_6$ = 0.9 mol/kg | 0% |
| 16 | Gel: | EC/PC = 6/4, $LiPF_6$ = 0.9 mol/kg | 0% |

Charging Method

A charging operation was basically carried out by a method comprising two-stage constant-current and constant-voltage charge. A first stage is a charging operation for reducing VC on an anode to form a stable coat. The charging operation is carried out on the basis of time. When it takes short time to complete the charging operation, the charging operation substantially corresponds to a constant-current charge.

A second charging step serves to completely charge a battery. At that time, a constant-voltage value was set to 4.25 V. When a current value is lowered up to 1% C, or when prescribed time elapses, the charging operation is considered to be completed. Under these conditions, a current is damped to finish the charging operation substantially for 5 hours to 9 hours.

A rest step is provided between the first and second charging stages.

In this connection, 1 C designates a current value when the rated capacity of the battery is completely discharged for one hour. In this case, the rated capacity of the battery is 500 mAh on the basis of 100 mA measurement, 1 C is equal to 500 mA, 0.5 C is equal to 250 mA, 0.2 C is equal to 100 mA, 4%C is equal to 0.04 C and to 20 mA and 1% C is equal to 5 mA.

Referring to Table 2 shown below, charging methods 20 and 21 do not include the first charging stage, but include only the second charging stage, in other words, these methods indicate charging methods composed of only one stage.

Further, a charging method that a charging operation the same as that of a charging method 1 is carried out with the lapse of 6 hours after the constant-current and constant-voltage charge of 2% C and 0.5 V is initially carried out for five minutes is considered to be a 23rd method.

Respective charging methods are shown in Table 2.

TABLE 2

| | First constant-current and constant-voltage charge | | |
|---|---|---|---|
| Charging method number Unit | Constant-current value % C | Constant-voltage value V | Finish time h |
| 1 |   | 2.4 | 2 |
| 2 | 4 | 2.5 | 2 |
| 3 | 4 | 2.6 | 2 |
| 4 | 4 | 2.9 | 2 |
| 5 | 4 | 3.0 | 2 |
| 6 | 4 | 3.1 | 2 |
| 7 | 4 | 3.2 | 2 |
| 8 | 4 | 3.3 | 2 |
| 9 | 4 | 3.5 | 2 |
| 10 | 4 | 3.7 | 2 |
| 11 | 4 | 3.8 | 2 |
| 12 | 4 | 3.9 | 2 |
| 13 | 4 | 2.7 | 1 |
| 14 | 4 | 3.2 | 1 |
| 15 | 2 | 3.2 | 6 |
| 16 | 8 | 3.2 | 1 |
| 17 | 4 | 3.2 | 2 |
| 18 | 4 | 3.2 | 2 |
| 19 |   |   |   |
| 20 |   |   |   |
| 21 |   |   |   |
| 22 | 4 | 3.2 | 2 |

| Charging method number Unit | Second constant-current and constant-voltage charge | | | |
|---|---|---|---|---|
| | Constant-current value % C | Constant-voltage value V | Finish time h | Finish current % C |
| 1 | 50 | 4.25 | 12 | 1 |
| 2 | 50 | 4.25 | 12 | 1 |
| 3 | 50 | 4.25 | 12 | 1 |
| 4 | 50 | 4.25 | 12 | 1 |
| 5 | 50 | 4.25 | 12 | 1 |
| 6 | 50 | 4.25 | 12 | 1 |
| 7 | 50 | 4.25 | 12 | 1 |
| 8 | 50 | 4.25 | 12 | 1 |
| 9 | 50 | 4.25 | 12 | 1 |
| 10 | 50 | 4.25 | 12 | 1 |
| 11 | 50 | 4.25 | 12 | 1 |
| 12 | 50 | 4.25 | 12 | 1 |
| 13 | 50 | 4.25 | 12 | 1 |
| 14 | 50 | 4.25 | 12 | 1 |
| 15 | 50 | 4.25 | 12 | 1 |
| 16 | 50 | 4.25 | 12 | 1 |
| 17 | 20 | 4.25 | 12 | 1 |
| 18 | 100 | 4.25 | 12 | 1 |
| 19 | 5 | 4.25 | 30 | 1 |
| 20 | 20 | 4.25 | 14 | 1 |
| 21 | 100 | 4.25 | 14 | 1 |
| 22 | 50 | 4.25 | 12 | 1 |

The respective batteries shown in the Table 1 are charged in accordance with the charging methods shown in Table 2 and battery characteristics were evaluated and the evaluations were carried out as described below.

Capacity Evaluation

After the charging operation was completed, a constant-current discharge was carried out up to 3 V under 100 mA to measure a discharging capacity after a rest of one hour. An initial charging and discharging efficiency (=initial discharging capacity/initial charging capacity) and a loss (=charging capacity−discharging capacity) were calculated from the above described discharging capacity. The charging capacity was the sum of the charging process including the two-stages.

Since each of the batteries has substantially the same capacity of the cathode, the charging capacity thereof is substantially 600 mAh. In the case of a battery including a small amount of solvent liable to be decomposed (such as PC) and high in its charging and discharging efficiency, a battery having the charging and discharging efficiency of 90% or higher and the initial discharging capacity of 540 mAh or more was considered to be a good product. In the case of a gel electrolyte battery including a large amount of PC liable to be decomposed, a battery having the charging and discharging efficiency of 85% or higher and the initial discharging capacity of 510 mAh or more is considered to be a good product.

Cyclic Characteristic

The constant-current and constant-voltage charge of 4.2 V and 500 mA (1 C) and a constant-current discharge of 500 mA with 3 V cut off were carried out to measure the change of the discharging capacity for each cycle. In the following Tables, a capacity maintenance factor after a 300th cycle was examined and a battery having the capacity maintenance factor of 80% or higher was judged to be a good product.

In this connection, the capacity maintenance factor is equal to a discharging capacity in a 300th cycle/a discharging capacity in a 5th cycle.

The capacity maintenance factor of 80% after the 300th cycle is a minimum value ordinarily required in the specification of a portable electronic device.

Measurement of Anode Potential

Lithium metal was inserted into a battery as a reference electrode and the potential of an anode was measured at the end of the constant-voltage charge in the first charging step to recognize whether or not the potential of the anode was regulated to a desired potential.

The results obtained by the above described measurements will be shown in Tables 3 to 10.

TABLE 3

| Charging method number Unit | Charging capacity mAh | Discharging capacity mAh | Initial efficiency % |
|---|---|---|---|
| Battery 1 | | | |
| 1 | 595 | 497 | 83.5 |
| 2 | 598 | 489 | 81.8 |
| 3 | 602 | 493 | 81.9 |
| 4 | 599 | 489 | 81.6 |
| 5 | 602 | 513 | 85.2 |
| 6 | 601 | 568 | 94.5 |
| 7 | 600 | 571 | 95.2 |
| 8 | 597 | 563 | 94.3 |
| 9 | 594 | 561 | 94.4 |
| 10 | 603 | 569 | 94.4 |
| 11 | 593 | 538 | 90.7 |
| 12 | 605 | 532 | 87.9 |
| 13 | 604 | 499 | 82.6 |
| 14 | 599 | 571 | 95.3 |
| 15 | 595 | 567 | 95.3 |

TABLE 3-continued

| Charging method number Unit | Charging capacity mAh | Discharging capacity mAh | Initial efficiency % |
|---|---|---|---|
| 16 | 600 | 565 | 94.2 |
| 17 | 597 | 566 | 94.8 |
| 18 | 603 | 568 | 94.2 |
| 19 | 602 | 577 | 95.8 |
| 20 | 600 | 537 | 89.5 |
| 21 | 591 | 478 | 80.9 |
| 22 | 597 | 563 | 94.3 |
| Battery 2 | | | |
| 1 | 596 | 502 | 84.2 |
| 2 | 600 | 494 | 82.3 |
| 3 | 599 | 501 | 83.6 |
| 4 | 601 | 505 | 84.0 |
| 5 | 603 | 555 | 92.0 |
| 6 | 599 | 573 | 95.7 |
| 7 | 597 | 577 | 96.6 |
| 8 | 598 | 575 | 96.2 |
| 9 | 596 | 567 | 95.1 |
| 10 | 600 | 568 | 94.7 |
| 11 | 595 | 548 | 92.1 |
| 12 | 603 | 539 | 89.4 |
| 13 | 601 | 501 | 83.4 |
| 14 | 601 | 574 | 95.5 |
| 15 | 599 | 570 | 95.2 |
| 16 | 598 | 569 | 95.2 |
| 17 | 601 | 575 | 95.7 |
| 18 | 601 | 568 | 94.5 |
| 19 | 600 | 580 | 96.7 |
| 20 | 597 | 545 | 91.3 |
| 21 | 593 | 483 | 81.5 |
| 22 | 596 | 563 | 94.5 |
| Battery 3 | | | |
| 1 | 597 | 501 | 83.9 |
| 2 | 599 | 499 | 83.3 |
| 3 | 603 | 505 | 83.7 |
| 4 | 598 | 512 | 85.6 |
| 5 | 602 | 533 | 88.5 |
| 6 | 600 | 577 | 96.2 |
| 7 | 598 | 578 | 96.7 |
| 8 | 601 | 578 | 96.2 |
| 9 | 594 | 569 | 95.8 |
| 10 | 598 | 570 | 95.3 |
| 11 | 599 | 551 | 92.0 |
| 12 | 602 | 543 | 90.2 |
| 13 | 599 | 504 | 84.1 |
| 14 | 603 | 581 | 96.4 |
| 15 | 597 | 571 | 95.6 |
| 16 | 596 | 572 | 96.0 |
| 17 | 604 | 577 | 95.5 |
| 18 | 603 | 571 | 94.7 |
| 19 | 602 | 577 | 95.8 |
| 20 | 598 | 549 | 91.8 |
| 21 | 591 | 500 | 84.6 |
| 22 | 597 | 572 | 95.8 |
| Battery 4 | | | |
| 1 | 591 | 442 | 74.8 |
| 2 | 596 | 451 | 75.7 |
| 3 | 597 | 449 | 75.2 |
| 4 | 603 | 453 | 75.1 |
| 5 | 600 | 477 | 79.5 |
| 6 | 597 | 524 | 87.8 |
| 7 | 600 | 550 | 91.7 |
| 8 | 601 | 541 | 90.0 |
| 9 | 599 | 536 | 89.5 |
| 10 | 607 | 541 | 89.1 |
| 11 | 602 | 510 | 84.7 |
| 12 | 607 | 513 | 84.5 |
| 13 | 608 | 499 | 82.1 |
| 14 | 604 | 530 | 87.7 |
| 15 | 608 | 559 | 91.9 |
| 16 | 610 | 525 | 86.1 |
| 17 | 604 | 549 | 90.9 |
| 18 | 607 | 542 | 89.3 |

TABLE 3-continued

| Charging method number Unit | Charging capacity mAh | Discharging capacity mAh | Initial efficiency % |
|---|---|---|---|
| 19 | 611 | 555 | 90.8 |
| 20 | 603 | 501 | 83.1 |
| 21 | 599 | 466 | 77.8 |
| 22 | 604 | 541 | 89.6 |

TABLE 4

| Charging method number Unit | Charging capacity mAh | Discharging capacity mAh | Initial efficiency % |
|---|---|---|---|
| Battery 5 | | | |
| 1 | 597 | 461 | 77.2 |
| 2 | 602 | 458 | 76.1 |
| 3 | 602 | 455 | 75.6 |
| 4 | 605 | 471 | 77.9 |
| 5 | 602 | 493 | 81.9 |
| 6 | 601 | 545 | 90.7 |
| 7 | 598 | 553 | 92.5 |
| 8 | 606 | 551 | 90.9 |
| 9 | 607 | 549 | 90.4 |
| 10 | 605 | 541 | 89.4 |
| 11 | 605 | 511 | 84.5 |
| 12 | 610 | 514 | 84.3 |
| 13 | 609 | 507 | 83.3 |
| 14 | 600 | 538 | 89.7 |
| 15 | 611 | 564 | 92.3 |
| 16 | 604 | 531 | 87.9 |
| 17 | 606 | 557 | 91.9 |
| 18 | 599 | 549 | 91.7 |
| 19 | 612 | 565 | 92.3 |
| 20 | 605 | 500 | 82.6 |
| 21 | 595 | 465 | 78.2 |
| 22 | 600 | 543 | 90.5 |
| Battery 6 | | | |
| 1 | 600 | 422 | 70.3 |
| 2 | 599 | 443 | 74.0 |
| 3 | 601 | 435 | 72.4 |
| 4 | 599 | 461 | 77.0 |
| 5 | 605 | 470 | 77.7 |
| 6 | 602 | 520 | 86.4 |
| 7 | 598 | 538 | 90.0 |
| 8 | 597 | 534 | 89.4 |
| 9 | 604 | 542 | 89.7 |
| 10 | 610 | 537 | 88.0 |
| 11 | 606 | 511 | 84.3 |
| 12 | 601 | 500 | 83.2 |
| 13 | 610 | 485 | 79.5 |
| 14 | 602 | 522 | 86.7 |
| 15 | 599 | 549 | 91.7 |
| 16 | 605 | 519 | 85.8 |
| 17 | 607 | 541 | 89.1 |
| 18 | 611 | 531 | 86.9 |
| 19 | 610 | 542 | 88.9 |
| 20 | 606 | 487 | 80.4 |
| 21 | 602 | 455 | 75.6 |
| 22 | 597 | 529 | 88.6 |
| Battery 7 | | | |
| 1 | 594 | 430 | 72.4 |
| 2 | 600 | 450 | 75.0 |
| 3 | 597 | 452 | 75.7 |
| 4 | 602 | 460 | 76.4 |
| 5 | 598 | 470 | 78.6 |
| 6 | 601 | 530 | 88.2 |
| 7 | 597 | 539 | 90.3 |
| 8 | 596 | 535 | 89.8 |
| 9 | 602 | 539 | 89.5 |
| 10 | 601 | 531 | 88.4 |
| 11 | 603 | 511 | 84.7 |

TABLE 4-continued

| Charging method number Unit | Charging capacity mAh | Discharging capacity mAh | Initial efficiency % |
|---|---|---|---|
| 12 | 604 | 504 | 83.4 |
| 13 | 610 | 488 | 80.0 |
| 14 | 601 | 524 | 87.2 |
| 15 | 602 | 561 | 93.2 |
| 16 | 605 | 529 | 87.4 |
| 17 | 598 | 546 | 91.3 |
| 18 | 602 | 538 | 89.4 |
| 19 | 614 | 549 | 89.4 |
| 20 | 607 | 496 | 81.7 |
| 21 | 602 | 458 | 76.1 |
| 22 | 601 | 537 | 89.4 |
| Battery 8 | | | |
| 1 | 596 | 432 | 72.5 |
| 2 | 599 | 451 | 75.3 |
| 3 | 601 | 485 | 80.7 |
| 4 | 598 | 533 | 89.1 |
| 5 | 603 | 541 | 89.7 |
| 6 | 604 | 553 | 91.6 |
| 7 | 603 | 555 | 92.0 |
| 8 | 602 | 544 | 90.4 |
| 9 | 598 | 524 | 87.6 |
| 10 | 605 | 511 | 84.5 |
| 11 | 600 | 502 | 83.7 |
| 12 | 605 | 499 | 82.5 |
| 13 | 608 | 475 | 78.1 |
| 14 | 606 | 520 | 85.8 |
| 15 | 607 | 557 | 91.8 |
| 16 | 603 | 533 | 88.4 |
| 17 | 602 | 549 | 91.2 |
| 18 | 597 | 542 | 90.8 |
| 19 | 611 | 544 | 89.0 |
| 20 | 605 | 488 | 80.7 |
| 21 | 607 | 439 | 72.3 |
| 22 | 602 | 539 | 89.5 |

TABLE 5

| Charging method number Unit | Charging capacity mAh | Discharging capacity mAh | Initial efficiency % |
|---|---|---|---|
| Battery 9 | | | |
| 1 | 600 | 501 | 83.5 |
| 2 | 602 | 527 | 87.5 |
| 3 | 597 | 539 | 90.3 |
| 4 | 595 | 527 | 88.6 |
| 5 | 609 | 511 | 83.9 |
| 6 | 602 | 501 | 83.2 |
| 7 | 600 | 510 | 85.0 |
| 8 | 598 | 507 | 84.8 |
| 9 | 601 | 506 | 84.2 |
| 10 | 605 | 499 | 82.5 |
| 11 | 602 | 487 | 80.9 |
| 12 | 604 | 482 | 79.8 |
| 13 | 604 | 542 | 89.7 |
| 14 | 607 | 507 | 83.5 |
| 15 | 604 | 511 | 84.6 |
| 16 | 601 | 499 | 83.0 |
| 17 | 602 | 497 | 82.6 |
| 18 | 596 | 505 | 84.7 |
| 19 | 604 | 544 | 90.1 |
| 20 | 609 | 477 | 78.3 |
| 21 | 600 | 442 | 73.7 |
| 22 | 595 | 500 | 84.0 |
| Battery 10 | | | |
| 1 | 597 | 498 | 83.4 |
| 2 | 600 | 487 | 81.2 |
| 3 | 605 | 502 | 83.0 |
| 4 | 597 | 507 | 84.9 |

TABLE 5-continued

| Charging method number Unit | Charging capacity mAh | Discharging capacity mAh | Initial efficiency % |
|---|---|---|---|
| 5 | 599 | 508 | 84.8 |
| 6 | 603 | 515 | 85.4 |
| 7 | 599 | 520 | 86.8 |
| 8 | 603 | 520 | 86.2 |
| 9 | 597 | 518 | 86.8 |
| 10 | 601 | 517 | 86.0 |
| 11 | 597 | 516 | 86.4 |
| 12 | 602 | 510 | 84.7 |
| 13 | 597 | 494 | 82.7 |
| 14 | 602 | 512 | 85.0 |
| 15 | 598 | 531 | 88.8 |
| 16 | 602 | 504 | 83.7 |
| 17 | 603 | 524 | 86.9 |
| 18 | 605 | 485 | 80.2 |
| 19 | 601 | 528 | 87.9 |
| 20 | 597 | 490 | 82.1 |
| 21 | 593 | 466 | 78.6 |
| 22 | 602 | 513 | 85.2 |
| Battery 11 | | | |
| 1 | 598 | 499 | 83.4 |
| 2 | 601 | 502 | 83.5 |
| 3 | 599 | 507 | 84.6 |
| 4 | 602 | 515 | 85.5 |
| 5 | 600 | 520 | 86.7 |
| 6 | 597 | 534 | 89.4 |
| 7 | 599 | 538 | 89.8 |
| 8 | 598 | 531 | 88.8 |
| 9 | 594 | 522 | 87.9 |
| 10 | 603 | 519 | 86.1 |
| 11 | 602 | 517 | 85.9 |
| 12 | 594 | 515 | 86.7 |
| 13 | 603 | 509 | 84.4 |
| 14 | 598 | 527 | 88.1 |
| 15 | 601 | 540 | 89.9 |
| 16 | 603 | 519 | 86.1 |
| 17 | 598 | 533 | 89.1 |
| 18 | 599 | 510 | 85.1 |
| 19 | 601 | 535 | 89.0 |
| 20 | 598 | 500 | 83.6 |
| 21 | 593 | 485 | 81.8 |
| 22 | 599 | 530 | 88.5 |
| Battery 12 | | | |
| 1 | 593 | 444 | 74.9 |
| 2 | 594 | 453 | 76.3 |
| 3 | 598 | 455 | 76.1 |
| 4 | 601 | 460 | 76.5 |
| 5 | 599 | 458 | 76.5 |
| 6 | 601 | 469 | 78.0 |
| 7 | 600 | 481 | 80.2 |
| 8 | 597 | 478 | 80.1 |
| 9 | 602 | 480 | 79.7 |
| 10 | 604 | 472 | 78.1 |
| 11 | 600 | 466 | 77.7 |
| 12 | 605 | 465 | 76.9 |
| 13 | 606 | 458 | 75.6 |
| 14 | 603 | 455 | 75.5 |
| 15 | 610 | 481 | 78.9 |
| 16 | 605 | 443 | 73.2 |
| 17 | 602 | 480 | 79.7 |
| 18 | 601 | 462 | 76.9 |
| 19 | 611 | 483 | 79.1 |
| 20 | 605 | 471 | 77.9 |
| 21 | 602 | 462 | 76.7 |
| 22 | 599 | 470 | 78.5 |

TABLE 6

| Charging method number Unit | Charging capacity mAh | Discharging capacity mAh | Initial efficiency % |
|---|---|---|---|
| Battery 13 | | | |
| 1 | 597 | 425 | 71.2 |
| 2 | 600 | 440 | 73.3 |
| 3 | 602 | 433 | 71.9 |
| 4 | 597 | 459 | 76.9 |
| 5 | 595 | 472 | 79.3 |
| 6 | 605 | 475 | 78.5 |
| 7 | 604 | 485 | 80.3 |
| 8 | 607 | 482 | 79.4 |
| 9 | 598 | 485 | 81.1 |
| 10 | 601 | 479 | 79.7 |
| 11 | 599 | 477 | 79.6 |
| 12 | 605 | 465 | 76.9 |
| 13 | 602 | 460 | 76.4 |
| 14 | 604 | 471 | 78.0 |
| 15 | 603 | 490 | 81.3 |
| 16 | 596 | 471 | 79.0 |
| 17 | 595 | 473 | 79.5 |
| 18 | 602 | 469 | 77.9 |
| 19 | 612 | 485 | 79.2 |
| 20 | 605 | 473 | 78.2 |
| 21 | 598 | 451 | 75.4 |
| 22 | 602 | 473 | 78.6 |
| Battery 14 | | | |
| 1 | 596 | 435 | 73.0 |
| 2 | 599 | 445 | 74.3 |
| 3 | 601 | 453 | 75.4 |
| 4 | 597 | 461 | 77.2 |
| 5 | 565 | 472 | 83.5 |
| 6 | 594 | 480 | 80.8 |
| 7 | 602 | 484 | 80.4 |
| 8 | 608 | 481 | 79.1 |
| 9 | 610 | 469 | 76.9 |
| 10 | 603 | 465 | 77.1 |
| 11 | 608 | 464 | 76.3 |
| 12 | 610 | 453 | 74.3 |
| 13 | 599 | 449 | 75.0 |
| 14 | 608 | 458 | 75.3 |
| 15 | 602 | 470 | 78.1 |
| 16 | 603 | 462 | 76.6 |
| 17 | 601 | 483 | 80.4 |
| 18 | 598 | 477 | 79.8 |
| 19 | 608 | 491 | 80.8 |
| 20 | 614 | 484 | 78.8 |
| 21 | 605 | 459 | 75.9 |
| 22 | 589 | 479 | 81.3 |
| Battery 15 | | | |
| 1 | 600 | 434 | 72.3 |
| 2 | 602 | 453 | 75.2 |
| 3 | 597 | 483 | 80.9 |
| 4 | 595 | 489 | 82.2 |
| 5 | 610 | 482 | 79.0 |
| 6 | 605 | 490 | 81.0 |
| 7 | 609 | 492 | 80.8 |
| 8 | 610 | 485 | 79.5 |
| 9 | 611 | 480 | 78.6 |
| 10 | 608 | 477 | 78.5 |
| 11 | 615 | 478 | 77.7 |
| 12 | 604 | 471 | 78.0 |
| 13 | 612 | 453 | 74.0 |
| 14 | 616 | 480 | 77.9 |
| 15 | 610 | 489 | 80.2 |
| 16 | 599 | 472 | 78.8 |
| 17 | 602 | 477 | 79.2 |
| 18 | 597 | 462 | 77.4 |
| 19 | 608 | 491 | 80.8 |
| 20 | 595 | 482 | 71.0 |
| 21 | 605 | 469 | 77.5 |
| 22 | 595 | 473 | 79.5 |

TABLE 6-continued

| Charging method number Unit | Charging capacity mAh | Discharging capacity mAh | Initial efficiency % |
|---|---|---|---|
| Battery 16 | | | |
| 1 | 601 | 487 | 81.0 |
| 2 | 603 | 490 | 81.3 |
| 3 | 599 | 493 | 82.3 |
| 4 | 600 | 477 | 79.5 |
| 5 | 610 | 476 | 78.0 |
| 6 | 599 | 466 | 77.8 |
| 7 | 600 | 474 | 79.0 |
| 8 | 603 | 470 | 77.9 |
| 9 | 604 | 471 | 78.0 |
| 10 | 608 | 453 | 74.5 |
| 11 | 603 | 466 | 77.3 |
| 12 | 597 | 463 | 77.6 |
| 13 | 602 | 448 | 74.4 |
| 14 | 610 | 461 | 75.6 |
| 15 | 612 | 488 | 79.7 |
| 16 | 603 | 472 | 78.3 |
| 17 | 605 | 479 | 79.2 |
| 18 | 602 | 463 | 76.9 |
| 19 | 597 | 484 | 81.1 |
| 20 | 599 | 465 | 77.6 |
| 21 | 598 | 439 | 73.4 |
| 22 | 602 | 475 | 78.9 |

TABLE 7

| Charging method number | Cyclic characteristic % | Cyclic characteristic % | Cyclic characteristic % |
|---|---|---|---|
| Battery | 1 | 2 | 3 |
| 1 | 82 | 85 | 86 |
| 2 | 83 | 86 | 87 |
| 3 | 81 | 85 | 88 |
| 4 | 85 | 82 | 85 |
| 5 | 83 | 84 | 87 |
| 6 | 86 | 87 | 90 |
| 7 | 89 | 90 | 90 |
| 8 | 88 | 89 | 89 |
| 9 | 87 | 88 | 91 |
| 10 | 85 | 88 | 87 |
| 11 | 83 | 87 | 85 |
| 12 | 84 | 86 | 87 |
| 13 | 84 | 87 | 85 |
| 14 | 83 | 85 | 83 |
| 15 | 86 | 84 | 91 |
| 16 | 85 | 86 | 88 |
| 17 | 84 | 82 | 84 |
| 18 | 81 | 84 | 82 |
| 19 | 87 | 88 | 87 |
| 20 | 84 | 84 | 83 |
| 21 | 82 | 83 | 82 |
| 22 | 85 | 89 | 90 |
| Battery | 4 | 5 | 6 |
| 1 | 87 | 88 | 85 |
| 2 | 89 | 91 | 87 |
| 3 | 85 | 92 | 83 |
| 4 | 86 | 90 | 86 |
| 5 | 88 | 92 | 87 |
| 6 | 90 | 94 | 88 |
| 7 | 92 | 96 | 90 |
| 8 | 93 | 95 | 90 |
| 9 | 92 | 95 | 91 |
| 10 | 88 | 94 | 95 |
| 11 | 85 | 93 | 86 |
| 12 | 89 | 92 | 87 |
| 13 | 84 | 86 | 82 |
| 14 | 86 | 85 | 84 |

TABLE 7-continued

| Charging method number | Cyclic characteristic % | Cyclic characteristic % | Cyclic characteristic % |
|---|---|---|---|
| 15 | 91 | 93 | 88 |
| 16 | 87 | 90 | 84 |
| 17 | 88 | 89 | 87 |
| 18 | 84 | 86 | 84 |
| 19 | 86 | 90 | 85 |
| 20 | 84 | 85 | 82 |
| 21 | 85 | 86 | 83 |
| 22 | 90 | 90 | 88 |
| Battery | 7 | 8 | 9 |
| 1 | 86 | 83 | 87 |
| 2 | 88 | 85 | 90 |
| 3 | 85 | 90 | 92 |
| 4 | 87 | 88 | 91 |
| 5 | 88 | 84 | 86 |
| 6 | 89 | 83 | 86 |
| 7 | 92 | 91 | 88 |
| 8 | 92 | 90 | 88 |
| 9 | 91 | 91 | 85 |
| 10 | 90 | 87 | 87 |
| 11 | 86 | 89 | 88 |
| 12 | 87 | 84 | 91 |
| 13 | 83 | 85 | 91 |
| 14 | 87 | 83 | 83 |
| 15 | 88 | 91 | 88 |
| 16 | 85 | 86 | 84 |
| 17 | 86 | 88 | 86 |
| 18 | 85 | 84 | 82 |
| 19 | 87 | 84 | 91 |
| 20 | 85 | 83 | 85 |
| 21 | 83 | 81 | 82 |
| 22 | 88 | 85 | 84 |

TABLE 8

| Charging method number | Cyclic characteristic % | Cyclic characteristic % | Cyclic characteristic % |   |
|---|---|---|---|---|
| Battery | 10 | 11 | 12 | |
| 1 | 81 | 84 | 86 | |
| 2 | 81 | 85 | 88 | |
| 3 | 83 | 86 | 84 | |
| 4 | 84 | 84 | 86 | |
| 5 | 82 | 85 | 87 | |
| 6 | 84 | 88 | 88 | |
| 7 | 85 | 89 | 92 | |
| 8 | 86 | 87 | 91 | |
| 9 | 88 | 89 | 90 | |
| 10 | 84 | 85 | 86 | |
| 11 | 82 | 85 | 85 | |
| 12 | 84 | 86 | 87 | |
| 13 | 82 | 85 | 84 | |
| 14 | 81 | 81 | 84 | |
| 15 | 84 | 88 | 89 | |
| 16 | 83 | 84 | 87 | |
| 17 | 82 | 83 | 85 | |
| 18 | 81 | 81 | 82 | |
| 19 | 86 | 85 | 86 | |
| 20 | 83 | 82 | 82 | |
| 21 | 81 | 82 | 80 | |
| 22 | 82 | 87 | 85 | |
| Battery | 13 | 14 | 15 | 16 |
| 1 | 84 | 86 | 84 | 84 |
| 2 | 86 | 87 | 84 | 88 |
| 3 | 81 | 84 | 88 | 90 |
| 4 | 85 | 85 | 86 | 88 |
| 5 | 87 | 86 | 82 | 84 |

TABLE 8-continued

| Charging method number | Cyclic characteristic % | Cyclic characteristic % | Cyclic characteristic % | |
|---|---|---|---|---|
| 6 | 87 | 88 | 84 | 83 |
| 7 | 89 | 91 | 87 | 84 |
| 8 | 88 | 90 | 88 | 83 |
| 9 | 88 | 89 | 89 | 82 |
| 10 | 89 | 88 | 86 | 84 |
| 11 | 84 | 84 | 88 | 84 |
| 12 | 85 | 85 | 85 | 82 |
| 13 | 81 | 81 | 83 | 89 |
| 14 | 82 | 85 | 81 | 84 |
| 15 | 85 | 86 | 88 | 85 |
| 16 | 84 | 83 | 87 | 82 |
| 17 | 86 | 86 | 84 | 84 |
| 18 | 83 | 84 | 82 | 80 |
| 19 | 83 | 87 | 84 | 87 |
| 20 | 81 | 84 | 82 | 84 |
| 21 | 80 | 81 | 80 | 83 |
| 22 | 86 | 86 | 86 | 82 |

TABLE 9

| Battery Charging method number | Anode potential E/V vs. Li/Li$^+$ | | | | |
|---|---|---|---|---|---|
| | 1 | 2 | 3 | 4 | 5 |
| 1 | 1.63 | 1.62 | 1.63 | 1.62 | 1.63 |
| 2 | 1.50 | 1.49 | 1.52 | 1.51 | 1.49 |
| 3 | 1.39 | 1.39 | 1.39 | 1.40 | 1.39 |
| 4 | 1.05 | 1.05 | 1.06 | 1.05 | 1.05 |
| 5 | 0.96 | 0.96 | 0.95 | 0.96 | 0.96 |
| 6 | 0.85 | 0.85 | 0.86 | 0.85 | 0.86 |
| 7 | 0.76 | 0.75 | 0.76 | 0.75 | 0.76 |
| 8 | 0.66 | 0.65 | 0.66 | 0.65 | 0.65 |
| 9 | 0.47 | 0.48 | 0.48 | 0.48 | 0.47 |
| 10 | 0.29 | 0.29 | 0.30 | 0.29 | 0.29 |
| 11 | 0.20 | 0.20 | 0.21 | 0.21 | 0.21 |
| 12 | 0.11 | 0.11 | 0.10 | 0.10 | 0.11 |
| 13 | 1.31 | 1.30 | 1.32 | 1.31 | 1.31 |
| 14 | 0.76 | 0.75 | 0.76 | 0.75 | 0.75 |
| 15 | 0.75 | 0.75 | 0.75 | 0.76 | 0.76 |
| 16 | 0.76 | 0.75 | 0.76 | 0.75 | 0.75 |
| 17 | 0.76 | 0.75 | 0.76 | 0.75 | 0.76 |
| 18 | 0.75 | 0.75 | 0.76 | 0.76 | 0.75 |
| 19 | — | — | — | — | — |
| 20 | — | — | — | — | — |
| 21 | — | — | — | — | — |
| 22 | 0.76 | 0.75 | 0.76 | 0.75 | 0.76 |

| Battery Charging method number | Anode potential B/V vs. Li/Li$^+$ | | | |
|---|---|---|---|---|
| | 6 | 7 | 8 | 9 |
| 1 | 1.63 | 1.62 | 1.38 | 1.00 |
| 2 | 1.50 | 1.50 | 1.29 | 0.89 |
| 3 | 1.40 | 1.40 | 1.17 | 0.80 |
| 4 | 1.06 | 1.06 | 0.85 | 0,51 |
| 5 | 0.96 | 0.95 | 0.73 | 0.41 |
| 6 | 0.86 | 0.85 | 0.64 | 0.30 |
| 7 | 0.76 | 0.76 | 0.53 | 0.21 |
| 8 | 0.66 | 0.66 | 0.42 | 0.11 |
| 9 | 0.48 | 0.48 | 0.22 | −0.09 |
| 10 | 0.29 | 0.29 | 0.14 | −0.30 |
| 11 | 0.20 | 0.20 | 0.09 | 0.68 |
| 12 | 0.11 | 0.10 | −0.03 | 0.18 |
| 13 | 1.30 | 1.31 | 1.08 | 0.67 |
| 14 | 0.75 | 0.75 | 0.51 | 0.18 |
| 15 | 0.76 | 0.76 | 0.48 | 0.17 |
| 16 | 0.75 | 0.75 | 0.49 | 0.18 |
| 17 | 0.75 | 0.76 | 0.50 | 0.18 |
| 18 | 0.76 | 0.76 | 0.49 | 0.17 |
| 19 | — | — | — | — |
| 20 | — | — | — | — |
| 21 | — | — | — | — |
| 22 | 0.75 | 0.75 | 0.50 | 0.29 |

TABLE 10

| Battery Charging method number | Anode potential B/V vs. Li/Li$^+$ | | | |
|---|---|---|---|---|
| | 10 | 11 | 12 | 13 |
| 1 | 1.63 | 1.63 | 1.62 | 1.63 |
| 2 | 1.50 | 1.52 | 1.51 | 1.50 |
| 3 | 1.39 | 1.39 | 1.40 | 1.40 |
| 4 | 1.05 | 1.06 | 1.05 | 1.06 |
| 5 | 0.96 | 0.95 | 0.96 | 0.96 |
| 6 | 0.85 | 0.86 | 0.85 | 0.86 |
| 7 | 0.76 | 0.76 | 0.75 | 0.76 |
| 8 | 0.66 | 0.66 | 0.65 | 0.66 |
| 9 | 0.47 | 0.48 | 0.48 | 0.48 |
| 10 | 0.29 | 0.30 | 0.29 | 0.29 |
| 11 | 0.20 | 0.21 | 0.21 | 0.20 |
| 12 | 0.11 | 0.10 | 0.10 | 0.11 |
| 13 | 1.31 | 1.32 | 1.31 | 1.30 |
| 14 | 0.76 | 0.76 | 0.75 | 0.75 |
| 15 | 0.75 | 0.75 | 0.76 | 0.76 |
| 16 | 0.76 | 0.76 | 0.75 | 0.75 |
| 17 | 0.76 | 0.76 | 0.75 | 0.75 |
| 18 | 0.75 | 0.76 | 0.76 | 0.76 |
| 19 | — | — | — | — |
| 20 | — | — | — | — |
| 21 | — | — | — | — |
| 22 | 0.76 | 0.76 | 0.75 | 0.75 |

| Battery Charging method number | Anode potential B/V vs. Li/Li$^+$ | | |
|---|---|---|---|
| | 14 | 15 | 16 |
| 1 | 1.62 | 1.38 | 1.00 |
| 2 | 1.50 | 1.29 | 0.89 |
| 3 | 1.40 | 1.17 | 0.80 |
| 4 | 1.06 | 0.85 | 0.51 |
| 5 | 0.95 | 0.73 | 0.41 |
| 6 | 0.85 | 0.64 | 0.30 |
| 7 | 0.76 | 0.53 | 0.21 |
| 8 | 0.66 | 0.42 | 0.11 |
| 9 | 0.48 | 0.22 | −0.09 |
| 10 | 0.29 | 0.14 | −0.30 |
| 11 | 0.20 | 0.09 | 0.68 |
| 12 | 0.10 | −0.03 | 0.18 |
| 13 | 1.31 | 1.08 | 0.67 |
| 14 | 0.75 | 0.51 | 0.18 |
| 15 | 0.76 | 0.48 | 0.17 |
| 16 | 0.75 | 0.49 | 0.18 |
| 17 | 0.76 | 0.50 | 0.18 |
| 18 | 0.76 | 0.49 | 0.17 |
| 19 | — | — | — |
| 20 | — | — | — |
| 21 | — | — | — |
| 22 | 0.75 | 0.50 | 0.29 |

As apparent from these Tables, each battery including the VC has the high initial charging and discharging efficiency, the high capacity and little wasteful reaction. As a result, the battery including the VC effectively has a large discharging capacity and a high energy density. However, in order to sufficiently realize the addition effect of the VC, it is necessary to perform a charging operation in which lithium is inserted into the battery after the potential of the anode is held at a potential under which the VC is reduced and the solvent is not decomposed.

This first charging step is changed depending on the cathode. When the cathode is composed of $LiCoO_2$, the battery voltage needs to be set to about 3.1 V to about 3.2 V and the potential of the anode needs to be set to about 0.85 V. When the battery voltage is set to a low voltage side from this range, for instance, 2.9 V, the capacity is greatly lowered. On the contrary, when the battery voltage is set to 3.8 V in a high voltage side from the range, the capacity is not greatly but slightly lowered.

As a current value, about 4% C is suitable. When the current value is too large, it will not be significant to carry out the charging operation having two-stages and a capacity will be lowered. A small current value does not cause any problem in view of capacity, however, much time is required to deteriorate the productivity.

In the second charging step, the current value may be increased to a value as large as 1 C. When the current value is decreased, the capacity will be increased, however, a required time will be increased and the productivity will be deteriorated. This may be adapted to the first charging step. An initial charging method including two-stages can ensure a high capacity in a short time.

Solution including no VC can realize the effect of the initial charging operation with the two-stages, because the coat composed of the solvent such as EC, PC, or the like is formed so as to reduce a loss capacity. However, the effect of the high capacity is low in the solution including no VC.

In the case of the battery including a large amount of PC, there exists a large difference between a case where the initial charging operation having the two-stages is performed and a case where the initial charging operation having the two-stages is not performed. Especially, the effect of the high capacity in the initial charging operation with the two-stages is improved. Before the initial charging operation with the two-stages, a charging operation under 0.5 V may be carried out in order to prevent the elution of copper.

Further, in the battery subjected to the initial charging operation with the two-stages, the cyclic characteristic is slightly improved. Even when the initial charging operation with the two-stages is not carried out, the cyclic characteristic of the battery is not bad, and further, it can be more improved by performing the initial charging operation composed of the two-stages.

As can be understood from the above description, according to the present invention, the initial charging and discharging efficiency can be improved, the preparation of wasteful materials can be reduced and the high capacity and the cyclic characteristic can be improved without deteriorating the various properties of the battery.

Therefore, the present invention can extremely contribute to the improvement of performance of the battery and further to the development of the industry related to the portable electronic devices.

What is claimed is:

1. A charging method for initially charging a nonaqueous electrolyte secondary battery comprising an anode, a cathode and an electrolyte including a plurality of kinds of nonaqueous solvents, said nonaqueous solvents including a main solvent and one or more kinds of nonaqueous solvents having a reduction potential higher than that of the main solvent; said charging method comprising:

charging steps of two or more stages including a first charging step in which the potential of the anode is maintained in a potential where any one of the nonaqueous solvents having the reduction potential higher than that of the main solvent is reduced and decomposed and the main solvent is not reduced nor decomposed to achieve a first charging process.

2. The charging method for charging a nonaqueous electrolyte secondary battery according to claim 1, comprising a second charging step in which a charging operation is carried out so that the potential of the anode is lower than the potential in said first charging step.

3. The charging method for charging a nonaqueous electrolyte secondary battery according to claim 2, wherein assuming that the reduction potential of the nonaqueous solvent higher than the reduction potential of said main solvent is A, the reduction potential of a nonaqueous solvent having the highest potential in the main solvent is B and the potential of the anode is E, said first charging step is carried out so as to satisfy a relation of B<E<A and said second charging step is carried out so as to satisfy a relation of E<B.

4. The charging method for charging a nonaqueous electrolyte secondary battery according to claim 2, wherein said second charging step is a charging step for completely charging the nonaqueous electrolyte secondary battery.

5. The charging method for charging a nonaqueous electrolyte secondary battery according to claim 1, wherein said first charging step is carried out by charging the nonaqueous electrolyte secondary battery under a constant-current or under a constant-current and constant-voltage.

6. The charging method for charging a nonaqueous electrolyte secondary battery according to claim 1, wherein a charging current value in said first charging step is 10% C or lower.

7. The charging method for charging a nonaqueous electrolyte secondary battery according to claim 1, wherein the nonaqueous solvent reduced and decomposed in said first charging step is vinylene carbonate and/or derivatives thereof.

8. The charging method for charging a nonaqueous electrolyte secondary battery according to claim 7, wherein the amount of vinylene carbonate and/or derivatives thereof contained in the nonaqueous solvents is 0.05 wt % to 5 wt % of all of the nonaqueous solvents.

9. The charging method for charging a nonaqueous electrolyte secondary battery according to claim 1, wherein ethylene carbonate and/or propylene carbonate is included as said main solvent.

10. The charging method for charging a nonaqueous electrolyte secondary battery according to claim 1, wherein said anode includes a carbon material as an anode active material.

11. The charging method for charging a nonaqueous electrolyte secondary battery according to claim 1, wherein said anode has a current collector composed of copper and an initial charging step for preventing the elusion of copper is carried out before said first charging step.

12. The charging method for charging a nonaqueous electrolyte secondary battery according to claim 11, wherein said initial charging step is carried out until battery voltage reaches 0.5 V to 1.0 V.

13. The charging method for charging a nonaqueous electrolyte secondary battery according to claim 1, wherein said electrolyte is electrolytic solution.

14. The charging method for charging a nonaqueous electrolyte secondary battery according-to claim 1, wherein said electrolyte is a gel electrolyte or a solid electrolyte.

15. A charging method for initially charging a nonaqueous electrolyte secondary battery comprising an anode, a cathode and an electrolyte including a plurality of kinds of nonaqueous solvents, said nonaqueous solvents including a main solvent and one or more kinds of nonaqueous solvents having a reduction potential higher than that of the main solvent; said charging method comprising:

charging steps of two or more stages including a first charging step in which the value of the end voltage of a constant-current charge or the value of the constant-voltage of a constant-current and constant-voltage charge is set so that the potential of the anode ranges from 0.7 V to 3.0 V by using the potential of lithium metal as a reference to achieve a first charging process.

16. The charging method for charging a nonaqueous electrolyte secondary battery according to claim 15, comprising a second charging step in which a charging operation is carried out so that the potential of the anode is lower than the potential in said first charging step.

17. The charging method for charging a nonaqueous electrolyte secondary battery according to claim 16, wherein assuming that the reduction potential of the nonaqueous solvent higher than the reduction potential of said main solvent is A, the reduction potential of a nonaqueous solvent having the highest reduction potential in the main solvent is B and the potential of the anode is E, said first charging step is carried out so as to satisfy a relation of B<E<A and said second charging step is carried out so as to satisfy a relation of E<B.

18. The charging method for charging a nonaqueous electrolyte secondary battery according to claim 16, wherein said second charging step is a charging step for completely charging the nonaqueous electrolyte secondary battery.

19. The charging method for charging a nonaqueous electrolyte secondary battery according to claim 15, wherein said first charging step is carried out by charging the nonaqueous electrolyte secondary battery under constant-current or under constant-current and constant-voltage.

20. The charging method for charging a nonaqueous electrolyte secondary battery according to claim 15, wherein a charging current value in said first charging step is 10% C or lower.

21. The charging method for charging a nonaqueous electrolyte secondary battery according to claim 15, wherein the nonaqueous solvents having the reduction potential higher than that of the main solvent include vinylene carbonate and/or the derivatives thereof and the vinylene carbonate and/or carbonates thereof are reduced and decomposed in said first charging step.

22. The charging method for charging a nonaqueous electrolyte secondary battery according to claim 21, wherein the amount of vinylene carbonate and/or derivatives thereof contained in the nonaqueous solvents is 0.05 wt % to 5 wt % of all of the nonaqueous solvents.

23. The charging method for charging a nonaqueous electrolyte secondary battery according to claim 15, wherein ethylene carbonate and/or propylene carbonate is included as said main solvent.

24. The charging method for charging a nonaqueous electrolyte secondary battery according to claim 21, wherein said nonaqueous electrolyte secondary battery comprises the anode including a carbon material as an anode active material and the cathode including as a cathode active material $LiCoCO_2$ and/or lithium cobalt compound oxide obtained by replacing a part of Co by other elements, said first charging step designates a constant-current charge or a constant-current and constant-voltage charge in which the value of the end voltage or the value of the constant-voltage ranges from 3.1 V to 3.7 V, and then, a constant-current charge or a constant-current and constant-voltage charge in which the value of end voltage or the value of constant-voltage exceeds the value of the end voltage or the value of the constant-voltage in the first charging step and is not higher than 4.4 V is carried out as a second charging step.

25. The charging method for charging a nonaqueous electrolyte secondary battery according to claim 21, wherein said nonaqueous electrolyte secondary battery comprises the anode including a carbon material as an anode active material and the cathode including as a cathode active material $LiMn_2O_4$, $LiNiO_2$ or at least one kind of lithium compound oxide selected from among lithium compound oxides obtained by replacing a part of Mn or Ni by other elements, said first charging step designates a constant-current charge or a constant-current and constant-voltage charge in which the value of the end voltage or the value of the constant-voltage ranges from 2.8 V to 3.6 V, and then, a constant-current charge or a constant-current and constant-voltage charge in which the value of end voltage or the value of constant-voltage exceeds the value of the end voltage or the value of the constant-voltage in the first charging step and is not higher than 4.4 V is carried out as a second charging step.

26. The charging method for charging a nonaqueous electrolyte secondary battery according to claim 21, wherein said nonaqueous electrolyte secondary battery comprises the anode including a carbon material as an anode active material and the cathode including as a cathode active material $LiFePO_4$ and/or olivine compound oxide obtained by replacing a part of Fe by other elements, said first charging step designates a constant-current and constant- voltage charge in which the value of the end voltage or the value of the constant-voltage ranges from 2.5 V to 2.9 V, and then, a constant-current charge or a constant-current and constant-voltage charge in which the value of end voltage or the value of constant-voltage exceeds the value of the end voltage or the value of the constant-voltage in the first charging step and is not higher than 4.4 V is carried out as a second charging step.

27. The charging method for charging a nonaqueous electrolyte secondary battery according to claim 15, wherein said anode has a current collector composed of copper and an initial charging step for preventing the elusion of copper is carried out before the first charging step.

28. The charging method for charging a nonaqueous electrolyte secondary battery according to claim 27, wherein said initial charging step is carried out until battery voltage reaches 0.5 V to 1.0 V.

29. The charging method for charging a nonaqueous electrolyte secondary battery according to claim 15, wherein said electrolyte is electrolytic solution.

30. The charging method for charging a nonaqueous electrolyte secondary battery according to claim 15, wherein said electrolyte is a gel electrolyte or a solid electrolyte.

* * * * *